United States Patent
Yamamori et al.

(10) Patent No.: US 6,462,102 B1
(45) Date of Patent: Oct. 8, 2002

(54) RESIN FOR USE IN AN ANTIFOULING COATING AND ANTIFOULING COATING

(75) Inventors: Naoki Yamamori, Kyotanabe; Isao Nakamura, Kyoto; Yoshinori Kushi, Neyagawa; Junji Yokoi, Ikoma; Tomokazu Arai, Neyagawa, all of (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/401,854

(22) Filed: Sep. 22, 1999

(51) Int. Cl.$^7$ .............................. C09D 5/16; C08F 30/06
(52) U.S. Cl. .................. 523/122; 106/15.05; 106/18.3; 106/18.32; 106/18.34; 106/18.36; 523/177; 525/328.2; 525/337; 525/383; 525/509
(58) Field of Search ................................ 525/337, 509, 525/328.2, 383; 523/122; 106/15.05, 18.3, 18.32, 18.34, 18.36

(56) References Cited

U.S. PATENT DOCUMENTS

| | | | |
|---|---|---|---|
| 3,666,656 A | * 5/1972 | Stanley | 208/48 AA |
| 3,772,182 A | * 11/1973 | Hubbard | 208/48 AA |
| 4,565,856 A | 1/1986 | Trotz et al. | 526/265 |
| 5,861,435 A | * 1/1999 | Yokoi | 514/570 |
| 5,914,357 A | * 6/1999 | Nakamura | 523/177 |
| 5,985,012 A | * 11/1999 | Nakamura | 106/15.05 |

FOREIGN PATENT DOCUMENTS

| WO | WO97/09356 | 3/1997 |
|---|---|---|
| WO | WO98/33829 | 8/1998 |

OTHER PUBLICATIONS

Patent Abstracts of Japan, Publication No. 08277372, Oct. 22, 1996.

* cited by examiner

*Primary Examiner*—Fred Zitomer
(74) *Attorney, Agent, or Firm*—Connolly Bove Lodge & Hutz LLP

(57) ABSTRACT

The present invention is related to a resin for use in an antifouling coating which is a polymer obtained by polymerizing a polymerizable unsaturated monomer(s) and having, at side chain terminals thereof, a trisubstituted borane-amine complex and an azomethine group, or a group represented by the following general formula (1):

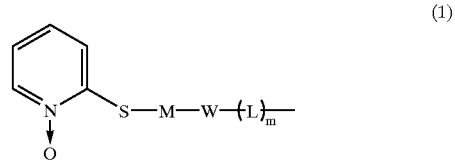

(1)

(wherein M represents a metal selected from the group consisting of copper, zinc, nickel and cobalt, - - - means a chemically bound state, W represents —N($R^1$)$R^2$— (in which $R^1$ and $R^2$ may be the same or different and each represents a hydrogen atom or an alkyl group containing 1 to 4 carbon atoms), —OCO—, —OSO$_2$— or

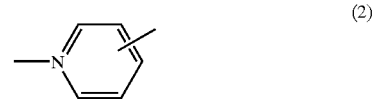

(2)

L represents an alkylene group containing 1 to 4 carbon atoms, and m represents an integer of 0 to 4).

5 Claims, No Drawings

RESIN FOR USE IN AN ANTIFOULING COATING AND ANTIFOULING COATING

TECHNICAL FIELD

The present invention relates to a resin for use in an antifouling coating to be applied to ships, fishing nets and the like, and to an antifouling coating containing said resin.

BACKGROUND ART

An aquatic life, such as barnacles, ascidians, serpulas, Saxidomus bivalves, Bugula bryozoans, green laver and sea lettuce, tends to attach itself to various bodies or structures in the water, causing various kinds of damages. For instance, attachment of such an aquatic life to the hull of a ship will reduce the velocity of the ship, causing an increase in the rate of fuel consumption. When such an aquatic life has attached itself to a fishing net or the like, they may clog meshes of the net and cause death of fish, as is well known.

Therefore, antifouling coatings are used to prevent such an aquatic life from attaching itself to those bodies or structures in the water and growing thereon. As such antifouling coatings, coatings which comprise a polymer having trialkyltin moieties as a vehicle are known. Such antifouling coatings are excellent since the rate of elution of the antifoulant can be controlled at a minimum level necessary for maintaining the antifouling effect and thus the antifoulant can be eluted at a constant rate over a long period of time.

Said antifouling coatings, when applied to ships, for instance, release the tin compound as the result of hydrolysis, in the weakly alkaline milieu of seawater, of the trialkyltin-containing polymer used as vehicle, whereupon the vehicle becomes soluble in water and the coatings are eroded and smoothened. The coatings thus contribute to reducing the resistance due to friction with seawater and reducing the rate of fuel consumption. However, for fear that the trialkyltin compound so eluted should adversely affect the ecosystem, it has been demanded that the development of antifouling coatings which have low toxicity against mammals and thus can be used safely and, at the same time, are capable of insuring the long-sustained antifouling effect.

As compounds meeting such demand, complexes of boron-containing compounds with amines are known.

For example, U. S. Pat. No. 3,211,679 (1965) discloses an antifouling composition for use in seawater which contains, as an active ingredient, not less than 25% by weight of a complex of triphenylborane with a substituted or unsubstituted pyridine of the following general formula (5):

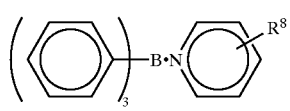

(5)

(wherein $R^8$ represents a hydrogen atom, a halogen atom, a lower alkyl group, an amido group, a cyclic hydrocarbon group or a heterocyclic group), each in meta or para position, or with an aliphatic amine.

Japanese Kokai Publication Sho-39-28579 discloses, as compounds capable of inhibiting growth of microorganisms, complexes of triphenylborane (in which each phenyl group may optionally have a halogen or lower alkoxy substituent in para position), tritolylborane or trinaphthylborane with an amine having a $PK_b$ value of not more than 10.

Japanese Kokoku Publication Sho-54-1571 discloses tetraphenylborane complexes represented by the following general formula (6):

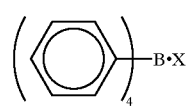

(6)

(wherein X represents a potassium atom, an ammonium group, or a quaternized nitrogen-containing group which may be in the form of a nitrogen-containing heterocyclic group).

Japanese Kokoku Publication Sho-62-25710 discloses, as antifoulant compounds, complexes of tetraarylboranes represented by the following general formula (7):

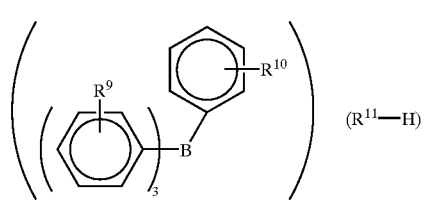

(7)

(wherein $R^9$ represents a hydrogen atom, a halogen atom or a lower alkyl group, $R^{10}$ represents a halogen atom, a lower alkyl group or a lower alkenyl group and $R^{11}$ represents a heterocyclic amine), with an ammonium or heterocyclic compound.

Japanese Kokoku Publication Sho-62-24022 discloses, as antifoulant compounds for use in underwater antifouling coatings, tetraphenylborane derivatives represented by the following general formula (8):

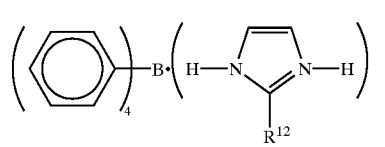

(8)

(wherein $R^{12}$ represents a lower alkyl group).

Japanese Kokai Publication Hei-07-133207 discloses an antifouling composition for fishing nets and implements which comprises triphenylborane-pyridine complex as an essential ingredient.

Japanese Kokai Publication Hei-08-295608 discloses an antifouling composition for fishing nets which comprises one or more triphenylborane-alkylamine complexes represented by the following general formula (9):

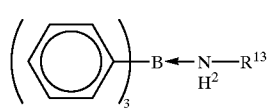

(9)

(wherein $R^{13}$ represents an alkyl group containing 3 to 30 carbon atoms, as active ingredients), and further an organic solvent for dissolving said active ingredients. Japanese Kokai Publication Hei-08-295609, also, discloses an antifouling composition for fishing nets which comprises an organic solvent and a complex of triphenylborane with a primary amine having an n-octadecyl group.

Japanese Kokai Publication Hei-08-295829 discloses an underwater antifouling coating which contains, as an active antifouling ingredient, a complex compound represented by the following general formula (10):

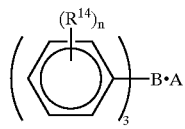

(10)

(wherein $R^{14}$ is a lower alkyl group, a lower alkoxy group or a halogen atom, n is 1, 2 or 3 and A represents a heterocyclic compound, which may optionally have a substituent or substituents selected from among lower alkyl, carboxyl, aminocarbonyl and so on, or ammonia or an amine compound of the formula $R^{15}R^{16}NH$ (in which $R^{15}$ and $R^{16}$ may be the same or different and each independently represents a hydrogen atom, an alkyl group or a cyclohexyl group)).

Japanese Kokai Publication Hei-09-78007 discloses an underwater antifouling coating which contains, as an active ingredient, a triphenylborane-hydroxyalkylamine complex represented by the following general formula (11):

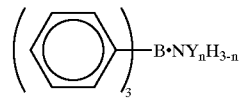

(11)

(wherein X represents a hydroxyalkyl group and n represents an integer of 1 to 3).

However, among the compounds referred to above, the complex of triphenylborane with pyridine or a pyridine derivative is scarcely soluble in organic solvents and, therefore, said complex component is generally contained in the coatings in a suspended state. The problem is that such coatings are difficult to handle since prolonged storage results in precipitation of said complex component.

Other complexes of boron-containing compounds with amine each is a single molecule compound and, therefore, the problem is that even when coatings are formed using a coating which contains the above-mentioned complex compound, it is difficult to control the rate of elution of said complex compound in water, so that the antifouling effect can hardly be maintained for a long period of time.

Japanese Kokai Publication Hei-11-199801 discloses an antifouling coating composition comprising a polymer containing a triarylborane coordinated to N atom as a vehicle. However, this coating composition has drawbacks that the antifouling effect can be maintained for only 3 to 6 months and that the resin itself is insufficiently self-polishing type.

On the other hand, Japanese Kokai Publication Hei-06-25560 discloses the combined use of a heavy metal compound and the copper salt of 2-pyridinethiol-1-oxide for antifouling coatings. This technology is characterized in that the antifouling coatings contain the salt of copper and a fundamental compound having the pyrithione skeleton. However, said technology intends to produce antifouling effects by merely blending such pyrithione skeleton-containing compound with a resin; it does not aim to provide the so-called functional polymer which has the basic feature of controlled hydrolysis and sustained release characteristics.

SUMMARY OF THE INVENTION

In view of the prior art mentioned above, the present invention has its object to provide a resin for use in an antifouling coating wherein an eluted antifoulant substance has low toxicity, an antifouling effect is based on a functional polymer having hydrolysis and sustained release characteristics highly controlled and very excellent antifouling effects over a long period of time are obtained, as well as an antifouling coating in which said resin is employed.

The present invention is related to a resin for use in an antifouling coating which comprises a polymer obtained by polymerizing a polymerizable unsaturated monomer(s) and having, at side chain terminals thereof, a trisubstituted borane-amine complex and an azomethine group, or a group represented by the following general formula (1):

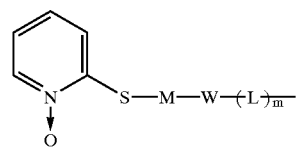

(1)

(wherein M represents a metal selected from the group consisting of copper, zinc, nickel and cobalt, --- means a chemically bound state, W represents $—N(R^1)R^2—$ (in which $R^1$ and $R^2$ may be the same or different and each represents a hydrogen atom or an alkyl group containing 1 to 4 carbon atoms), $—OCO—$, $—OSO_2—$ or

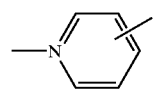

(2)

L represents an alkylene group containing 1 to 4 carbon atoms, and m represents an integer of 0 to 4).

In addition, the present invention relates to an antifouling coating comprising the above-mentioned resin for use in an antifouling coating.

DETAILED DESCRIPTION OF THE INVENTION

In the following, the present invention is described in detail.

The resin for use in an antifouling coating of the present invention is a polymer obtained by polymerizing a polymerizable unsaturated monomer(s) and having, at side chain terminals thereof, a trisubstituted borane-amine complex and an azomethine group, or a group represented by the following general formula (1) given above. Said polymer obtained by polymerizing a polymerizable unsaturated monomer(s) has a characteristic feature of the constitution of the basic polymer of the resin for use in an antifouling coating of the present invention.

Therefore, the "polymer obtained by polymerizing a polymerizable unsaturated monomer(s)" as so referred to herein may be any polymer obtained by polymerizing a polymerizable unsaturated monomer(s) and having a functional group allowing a trisubstituted borane-amine complex and an azomethine group, or a group of the above general formula (1) to be bound thereto and thus includes, without any particular limitations, various polymers, e.g. acrylic polymers, vinyl polymers and polyester polymers, among others. Said expression never restricts the method of producing said polymer but is a notion including, for instance, the case of polymerizing the above-mentioned various monomers with a trisubstituted borane-amine complex and an azomethine group, or a group of general formula (1) bound thereto to give resins for use in an antifouling coating of the present invention, as well.

[1] Cases where the Polymer has a Trisubstituted Borane-amine Complex and an Azomethine Group Bound thereto In cases where the polymer has a trisubstituted borane-amine complex and an azomethine group bound thereto at side chain terminals thereof, as for the trisubstituted borane-amine complex, the side chain terminals mentioned above generally have an amino group or a substituted or unsubstituted pyridine residue and these form complexes with the trisubstituted borane.

As said amino group, there may be mentioned, for example, groups of the following general formula (4):

(4)

wherein $R^6$ and $R^7$ may be the same or different and each represents a hydrogen atom, an alkyl group, an acyl group or an aryl group).

Said alkyl group is not particularly restricted but includes, among others, methyl, ethyl, n-propyl and i-propyl. Said acyl group is not particularly restricted but includes, among others, formyl, acetyl, propanoyl and propenoyl. Said aryl group includes phenyl, tolyl and so on. $R^6$ and $R^7$ may be the same or different.

The above amino group may be bound to a carbon atom constituting main polymer chain either directly or bound to via an organic group such as an alkylene group or a phenylene group.

As the substituent bound to the above pyridine residue, there may be mentioned an alkyl group, a halogen atom and the like. Generally, such substituent is bound to the 2 or 4 position. Said pyridine residue is generally bound to the main chain or a side chain terminal at the 2 or 4 position thereof.

In addition to those mentioned above, polylysine, chitosan and the like may be mentioned as amino-containing polymers.

Preferred as the trisubstituted borane mentioned above are preferably those represented by the following general formula (3):

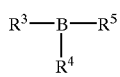
(3)

wherein $R^3$, $R^4$ and $R^5$ may be the same or different and each represents an aromatic or aliphatic hydrocarbon group containing 4 to 20 carbon atoms). If the number of carbon atoms in the hydrocarbon group is less than 4, the solubility in organic solvents will be poor, so that it will be difficult to increase the content in the resin. If the number of carbon atoms in the hydrocarbon group exceeds 20, the antifouling effect will become decreased. The number of carbon atoms in each of $R^3$, $R^4$ and $R^5$ is more preferably 4 to 16.

As $R^3$, $R^4$ and $R^5$, there may be mentioned, for example, n-butyl, i-butyl, t-butyl, n-pentyl, i-pentyl, n-hexyl, n-octyl, phenyl, benzyl, phenethyl, tolyl and xylyl. They may be the same or different.

As specific examples of such trisubstituted borane, there may be mentioned di-n-butylphenylborane, diphenyloctylborane, n-butyldiphenylborane, tri-n-butylborane, tri-n-pentylborane, triphenylborane and the like.

Among the trisubstituted boranes mentioned above, those in which two of $R^3$, $R^4$ and $R^5$ are phenyl, for example diphenyloctylborane, are preferred, and triphenylborane in which $R^3$, $R^4$ and $R^5$ each is a phenyl group is more preferred. When two of the substituents are phenyl, it is preferred that the remaining substituent be an alkyl group or an alkenyl group.

The above-mentioned resin for use in an antifouling coating useally has a number average molecular weight of about 400 to 80,000. If the number average molecular weight exceeds 80,000, the resin solution will have a markedly increased viscosity, hence a unnecessarily large amount of solvent will be required and in addition, the controlled release characteristic of the resin will be poor. If, conversely, the number average molecular weight is less than 400, the film-forming properties of the coating will be sacrificed. When the above-mentioned resin for use in an antifouling coating is used for an antifouling coating for fishing net, the number average molecular weight is preferably 500 to 1000 in the viewpoint of more demands for the flexibility of coating films. In the other hand, when the above-mentioned resin for use in an antifouling coating is used for an antifouling coating for ships, the number average molecular weight is preferably 1,500 to 30,000 in the viewpoint of more demands for the film-forming properties of coating films.

The content of the above-mentioned trisubstituted borane-amine complex residue is preferably 0.03 to 0.3 mole per 100 grams of the resulting resin for use in an antifouling coating. If it is less than 0.03 mole per 100 grams, the amount of the trisubstituted borane-containing compound released from the finally formed coating will become decreased, hence the antifouling effects will be insufficient. If it exceeds 0.3 mole per 100 grams, the film-forming properties of the coating will be poor.

The "polymer obtained by polymerizing a polymerizable unsaturated monomer(s) and having, at side chain terminals thereof, a trisubstituted borane-amine complex and an azomethine group" as so referred to above means only that the polymer finally obtained should have a trisubstituted borane-amine complex and an azomethine group bound to side chain terminals thereof regardless of the time when the amino group or substituted or unsubstituted pyridine residue (hereinafter collectively referred to as amino or like group) is formed and regardless of the time when the trisubstituted borane-amine complex and an azomethine group are formed.

Thus, for example, the polymer containing trisubstituted borane-amine complex may be produced by polymerizing an amino or like group-free polymerizable unsaturated monomer and then introducing an amino or like group into the resulting polymer.

Alternatively, the above-mentioned polymer containing trisubstituted borane-amine complex may be produced by homopolymerizing an amino or like group-containing polymerizable unsaturated monomer or copolymerizing such a monomer with copolymerizable monomer(s) to give a polymer having an amino or like group at a side chain terminal, followed by addition of the trisubstituted borane to said polymer.

Further, the polymer containing trisubstituted borane-amine complex may be produced by first causing addition of the trisubstituted borane to an amino or like group-containing polymerizable unsaturated monomer to give trisubstituted borane adduct-containing monomer and then homopolymerizing the resulting monomer or copolymerizing said trisubstituted borane adduct-containing monomer with copolymerizable monomer(s).

The above-mentioned trisubstituted borane adduct of polymerizable unsaturated monomer can be synthesized by first preparing an amine-trisubstituted borane complex and then subjecting this complex to amine exchange reaction with an amino or like group-containing polymerizable unsaturated monomer. It is also possible to produce said monomer by the method described in Japanese Kokai Publication Sho-62-277307 or Hei-08-311074.

The trisubstituted borane compound such as triphenylborane is generally unstable itself, and the reaction thereof with an amino or like group results in a target polymer with relatively low yield. Therefore, it is preferable to use a trisubstituted borane-base adduct such as sodium hydroxide adduct, or an amine-trisubstituted borane complex prepared beforehand.

As said amino or like group-containing polymerizable unsaturated monomer, there may be mentioned, among others, vinylpyridine, allylamine, vinylamine, aminostyrene and derivatives of these.

The above-mentioned polymerizable unsaturated monomer copolymerizable with such amino or like group-containing polymerizable unsaturated monomer is not particularly restricted but includes, for example, methyl (meth)acrylate, ethyl (meth)acrylate, i-propyl (meth)acrylate, n-butyl (meth)acrylate, i-butyl (meth)acrylate, t-butyl (meth)acrylate, 2-ethylhexyl (meth)acrylate, lauryl (meth)acrylate, stearyl (meth)acrylate, 2-hydroxypropyl (meth)acrylate, 2-hydroxyethyl (meth)acrylate, phenyl (meth)acrylate, cyclohexyl (meth)acrylate, polyethylene glycol mono(meth)acrylate and other (meth)acrylate esters; (meth)acrylic acid, (meth)acrylamide, styrene, vinyl acetate, acrylonitrile and the like. These monomers may be used either alone or in combination.

The method of polymerization of the above polymerizable unsaturated monomer(s) is not particularly restricted. Thus, for example, mention may be made of the method which comprises preparing a mixture solution by admixing N-vinylformamide or a like monomer, or such monomer and one or more other polymerizable monomers, with a polymerization initiator and then dropping the mixture dropwise to a solvent such as isopropyl alcohol with heating to thereby effecting the reaction.

According to the present invention, the polymer also has an azomethine group at a side chain terminal thereof. The azomthine group is not particularly limited to the time when it is formed, and may be formed before or after the trisubstituted borane-amine complex is formed. In view of steric hindrance of bulky trisubstituted borane, it is preferable to react with an aldehyde such as benzaldehyde or α-n-amyl cinnamaldehyde, the amino groups or pyridine residues which remain uninvolved in the complex formation with the trisubstituted borane in the resin for use in an antifouling coating, to form the corresponding aldehyde-derived azomethine group.

Such azomethine group formed also produces an antifouling effect and thus increases the antifouling effect of the above-mentioned resin for use in an antifouling coating. The azomethine group is gradually hydrolyzed in water to show antifouling effect, and then, the backbone chain of the resin gradually self-polishes to cause solubilization in water.

The aldehyde is not limited to the kind thereof if a Schiff base can be formed by reacting the aldehyde with the amino or like group. It may be, for example, an aliphatic aldehyde having antimicrobial action such as formaldehyde, glyoxal, succinic aldehyde, glutaric aldehyde and dialdehydes thereof, etc. In the present invention, even an aldehyde having no or weak antimicrobial action is effective because such the aldehyde shows an antifouling effect against attachment of an aquatic life in water. As such the aldehyde, benzaldehyde may typically be mentioned. Also such the aldehyde may be, for example, banzaldehyde derivatives having a substituent on the benzene ring such as p-n-hexylbenzaldehyde, p-octylbanzaldehyde, p-oleylbenzaldehyde, vanilline; aromatic aldehydes such as cinnamaldehyde; and saturated or unsaturated aliphatic aldehydes having not less than 6 carbon atoms such as capronaldehyde, caprylaldehyde, capric aldehyde, laurylaldehyde, stearylaldehyde, oleylaldehyde. In the view of easy manipulation and prolonged antifouling activity, benzaldehyde and the derivatives thereof and saturated or unsaturated aliphatic monoaldehydes having not less than 6 carbon atoms are preferred.

The content of the above-mentioned azomethine group may be 0.01 to 1.5 mole, preferably 0.1 to 1.0 mole, per 100 grams of the resulting resin for use in an antifouling coating.

[2] Cases where the Polymer has a Group of General Formula (1) as Bound thereto

In cases where the polymer mentioned above has a group of the above general formula (1) as bound to side chain terminals thereof, M in general formula (1) represents a metal selected from the group consisting of copper, zinc, nickel and cobalt. - - - means a chemically bound state. W represents —N($R^1$)$R^2$—, —OCO—, —OSO$_2$— or a group of the above formula (2). $R^1$ and $R^2$ may be the same or different and each represents a hydrogen atom or an alkyl group containing 1 to 4 carbon atoms. L represents an alkylene group containing 1 to 4 carbon atoms. m represents an integer of 0 to 4.

Said M is a metal atom directly bound to the S atom constituting pyrithione. Said M may be copper, zinc, nickel or cobalt. Among them, copper and zinc are preferred, however.

Said W is a lower alkyl-substituted or unsubstituted amino group, a carboxyl group, a sulfo group or a pyridino group. Said lower alkyl group is not particularly restricted but includes methyl, ethyl, propyl and butyl, for instance.

In the above general formula (1), - - - means that M and W are in a chemically bound state. By the term "chemically bound state", it is meant that M and W are chemically bound to each other. The chemically bound state is not particularly restricted in kind but includes, for example, covalent bonding, coordination bonding, ionic bonding and complex-forming bonding.

Therefore, in the present specification, the left-end symbol "—" appearing in —N($R^1$)$R^2$—, —OCO—, —OSO$_2$— or substituted pyridyl group (formula (2)) as mentioned each as an example of W in the above general formula (1) does not exclusively mean a covalent bond but may vary in the meaning thereof according to the bonding mode of the above-mentioned - - - -.

In the above general formula (1), L represents a divalent hydrocarbon group containing 1 to 4 carbon atoms and includes methylene, ethylene and propylene, among others. m represents the number of the L groups, which is an integer of 0 to 4. When m is 0, W is bound directly to a side chain terminal of the polymer.

The number average molecular weight of the above-mentioned resin for use in an antifouling coating is not particularly restricted but may be the same as mentioned above in relation to the cases where the polymer has a trisubstituted borane-amine complex and an azomethine group at side chain terminals thereof.

The above resin for use in an antifouling coating is not particularly restricted only if the condition that a group represented by the above general formula (1) is bound to a side chain terminal of the above polymer. A plurality of side chain terminals may each have such group bound thereto or different groups may be bound.

It is preferred that the above-mentioned group represented by general formula (1) be bound to the polymer in an amount of 0.01 to 0.3 mole per 100 grams of the resulting resin for use in an antifouling coating. If the content of said group is less than 0.01 mole, the amount of the antifoulant substance sustainedly released from the resulting coating will be too small for the effects of the present invention to be produced satisfactorily. If it exceeds 0.3 mole, the film-forming properties of the resulting coating will be reduced.

The polymer having a group of the above general formula (1) bound to side chain terminals thereof can be produced, for example, in the following manner.

An alkali metal salt of pyrithione is used and this is reacted with an inorganic metal salt such as a halide, sulfate or nitrate in water or an alcohol while adequately adjusting the pH, and the reaction product is isolated.

Mention may be made of the method which comprises reacting this isolated product with an organic acid moiety-containing monomer or a mixture of such monomer(s) copolymerizable therewith, to give a polymer, the method which comprises reacting said product isolated with an organic acid moiety-containing polymer to give a polymer, the method which comprises reacting said isolated product with an amine-containing monomer or a mixture of such monomer and one or more monomers copolymerizable therewith, to give a polymer, and the method which comprises reacting said isolated product with an amino-containing polymer to give a polymer, for instance.

Mention may further be made of the method which comprises reacting pyrithione, a low-molecular organic acid metal salt and an organic acid moiety-containing monomer in an appropriate solvent while distilling off the low-molecular organic acid, followed by reaction to give a polymer, a modification of this method which comprises carrying out said method in the presence of a copolymerizable monomer(s) to give a copolymer, the method which comprises reacting pyrithione and a low-molecular organic acid metal salt with an organic acid moiety-containing polymer in an appropriate solvent while distilling off the low-molecular organic acid to give a polymer, the method which comprises reacting an alkali metal salt of pyrithione, an inorganic metal salt and an organic acid-containing monomer in water and, after purification as necessary, further adding a copolymerizable monomer(s), to give a polymer, the method which comprises reacting an alkali metal salt of pyrithione, an inorganic metal salt and an organic acid polymer, and the method which comprises introducing a group of general formula (1) by the organic acid salt exchange reaction, among others.

In the various methods mentioned above, if the monomer is poorly soluble in the organic compound, the methods comprising reacting with a polymer having an appropriate reactive group(s) are preferably employed.

The above-mentioned copolymerizable monomer is not particularly restricted but includes, for example, vinylpyridine, allylamine, vinylamine, aminostyrene, vinylamide, allylamide and like amines and amides and, further, those mentioned hereinabove in relation to the cases where the polymer has a trisubstituted borane-amine complex and an azomethine group bound thereto at side chain terminals thereof.

In the case of the polymer having an amino group or pyridine residue at a side chain terminal thereof, it is preferable to react the amino group or pyridine residue with an aldehyde to form the corresponding aldehyde-derived azomethine group.

[3] Antifouling Coating

The resin for use in an antifouling coating of the present invention can judiciously be used in an antifouling coating, in particular in an antifouling coating to be applied to ship bottoms or fishing nets. An antifouling coating and an antifouling coating for fishing nets, which contains the above-mentioned resin for use in an antifouling coating, each constitutes a subject matter of the present invention.

The antifouling coating of the present invention is obtained by adding, to the above resin for use in an antifouling coating, additives in common use, such as additives include antifoulants, plasticizers, coating erosion modifiers, pigments, solvents and so on.

The above-mentioned antifoulants are not particularly restricted but any of those known in the art can be used. As examples, there may be mentioned metals in powder or flake form, such as copper, zinc and nickel; oxides, hydroxides and halides of metals such as copper and zinc; copper suboxide, copper rhodanide and other metal salts; carboxylic acid metal salts such as copper naphthenate and metal stearates; metal dithio-carbamates such as zinc dimethyldithiocarbamate, bisdimethyldithiocarbamoylzinc and ethylenebisdithiocarbamates; thiuram disulfides such as tetramethylthiuram disulfide; sulfamides such as phthalylsulfathiazole, sulfaethidole, sulfanilidopyridine, sulfamethoxine and N,N'-dimethyl-N'-phenyl-N-fluorodichloromethylthiosulfamide; pyrrols and imidazoles such as glyodin, phentizole, and polycide; thioxanes and thioxanthones such as terrazole, asterol and mylone; imides and amides such as nicarbazin, 3,4,5-tribromosalicylanilide, N-trichloromethylmercaptophthalimide, 3,5-dinitrobenzamide, 2,4,6-trichlorophenylmaleimide and N-fluorodichloromethylthiophthalimide; sulfur-containing organic compounds and halogen-containing organic compounds such as 2-methylthio-4-tert-butylamino-6-cyclopropylamino-s-triazine, 2,4,5,6-tetrachlorophthalonitrile, N,N'-dimethyldichlorophenylurea, 4,5-dichloro-2-n-octyl-3(2H)-isothiazoline, 2-pyridinethio-1-oxide zinc salt, 2-pyridinethiol-1-oxide copper salt, 2,3,5,6-tetrachloro-4-methylsulfonylpyridine, 3-iodo-2-propyl butylcarbamate and diuodomethyl paratolyl sulfone; pyridine-triphenylborane, alkylpyridine-triphnylborane, alkylamine-triphenylborane such as stearylamine-triphenylborane, and other agrochemicals, medicinals, microbicides and the like.

Said plasticizers are not particularly restricted but include, among others, phthalate ester plasticizers such as dioctyl phthalate, dimethyl phthalate and dicyclohexyl phthalate; aliphatic dibasic acid ester plasticizers such as diisobutyl adipate and dibutyl sebacate; glycol ester plasticizers such as diethylene glycol dibenzoate and pentaerythritol alkyl esters; phosphate ester plasticizers such as tricresyl phosphate and trichloroethyl phosphate; epoxy plasticizers such as epoxidized soybean oil and octyl epoxystearate; organotin plasticizers such as dioctyltin laurate and dibutyltin laurate; trioctyl trimellitate, triacetylene and the like.

Said coating erosion modifiers are not particularly restricted but include, among others, chlorinated paraffin, polyvinyl ethers, polypropylene sebacate, partially hydrogenated terphenyl, polyvinyl acetate, alkyl (meth) acrylate polymers, polyether polyols, alkyd resins, polyester resins, polyvinyl chloride, silicone oils, waxes, vaseline, liquid paraffin and the like.

Said pigments are not particularly restricted but include, among others, extenders such as precipitated barium sulfate, talc, clay, chalk, silica white, alumina white and bentonite; color pigments such as titanium oxide, zirconium oxide, basic lead sulfate, tin oxide, carbon black, graphite, iron oxide red, chrome yellow, phthalocyanine green, phthalocyanine blue and quinacridones; and the like.

Said solvents are not particularly restricted but include, among others, hydrocarbons such as toluene, xylene, ethylbenzene, cyclopentane, octane, heptane, cyclohexane and white spirits; ethers such as dioxane, tetrahydrofuran, ethylene glycol monomethyl ether, ethylene glycol monoethyl ether, ethylene glycol dimethyl ether, ethylene glycol monobutyl ether, ethylene glycol dibutyl ether, diethylene glycol monomethyl ether and diethylene glycol monoethyl ether; esters such as butyl acetate, propyl acetate, benzyl acetate, ethylene glycol monomethyl ether acetate and ethylene glycol monoethyl ether acetate; ketones such as ethyl isobutyl ketone and methyl isobutyl ketone; alcohols such as n-butanol and propyl alcohol; and the like.

Other additives than those mentioned above are not particularly restricted but include, among others, rosins, monobutyl phthalate, monooctyl succinate and like organic monobasic acids, camphor, castor oil and the like.

The above antifouling coating can be prepared by adding such additives in common use such as antifoulants, plasticizers, coating erosion modifiers, pigments, solvents and so forth to the above resin for use in an antifouling coating, followed by blending using a mixing machine such as a ball mill, pebble mill, roll mill or sand grind mill.

As mentioned above, the antifouling coating of the present invention contains the above-mentioned resin for use in an antifouling coating and, when used as an antifouling coating for ships, fishing nets, marine structures and the like, can form very excellent antifouling coatings which can gradually release the trisubstituted borane-containing compound and the compound resulting from the azomethine group, or the compound resulting from the group of general formula (1) from the coating films and thereby can maintain the antifouling effects over a long period of time. In particular when the polymer has a trisubstituted borane-amine complex and an azomethine group bound thereto at side chain terminals thereof, the elution of the trisubstituted borane-amine complex and the compound resulting from the azomethine group from the antifouling coatings can be controlled by adequately selecting the resin species for use in an antifouling coating, the side chain length and species of the trisubstituted borane-amine complex and the azomethine group bound at side chain terminals, among others.

When applied to ships and the like, the antifouling coating of the present invention can produce its excellent antifouling effects, inhibiting the attachment and/or growth of aquatic lives, such as barnacles, ascidians, serpulas, Saxidomus bivalves, fresh-water mussels and Bugula bryozoans, over a prolonged period of time.

When applied to fishing nets, said composition can prevent the attachment and/or growth of such an aquatic life as mentioned above over a long period of time and, in particular, it can effectively inhibit the attachment of seaweeds such as green laver and sea lettuce.

Thus, the antifouling coating of the present invention can suitably be applied to ships such as tankers, ferries, fishing boats, steel-clad ships, wooden vessels and FRP boats; marine structures, fishing nets for culture, fishing nets such as fixed shore nets or like, water conveyance ducts, fishing implements and so forth.

BEST MODES FOR CARRYING OUT THE INVENTION

The following examples illustrate the present invention in further detail. These examples are by no means limitative of the scope of the present invention, however.

Example 1

A four-necked flask equipped with a stirrer, nitrogen inlet tube, dropping funnel and condenser was charged with 150 g of a 40% (by weight) aqueous solution of polyallylamine (degree of polymerization: about 100) and the charge was heated and then maintained at 40° C. To this aqueous solution was added dropwise over 1 hour 208 g of a 10% (by weight) aqueous solution of triphenylborane-sodium hydroxide adduct, and the resulting mixture was maintained at 60° C. for 2 hours.

To this reaction mixture was then added 50 g of benzaldehyde dropwise over 1 hour, and the whole mixture was maintained at 60° C. for 2 hours. The resulting resin precipitate and supernatant were separated from each other and the precipitate was washed with three 500-mL portions of deionized water.

To the resin after washing was added 700 g of xylene and the residual water was removed by azeotropic distillation with xylene under reduced pressure at 60 to 85° C. The subsequent cooling gave a pale brown resin solution in xylene with a resin solid concentration of 55% by weight (resin solution A) was obtained.

Example 2

The same apparatus as used in Example 1 was charged with 160 g of isopropanol and 17.8 g of acrylamide, and the charge was heated and then maintained at 80° C. To this solution was added a mixture 35.6 g of N-vinylformamide (NVF), 138.6 g of methyl methacrylate and 6 g of α, α'-azobisisobutyronitrile dropwise over 6 hours. After the lapse of 30 minutes, a mixture of 40 g of isopropanol and 2 g of α, α'-azobisisobutyronitrile was added dropwise over 30 minutes. Thereafter, the same temperature was further maintained for 120 minutes to give an isopropanol solution with a copolymer solid concentration of 50% by weight.

Then, a separable flask equipped with a stirrer and condenser was charged with 200 g of the copolymer solution obtained above. To this was added 46 g of 2% ethanolic hydrochloric acid dropwise over 30 minutes. The resulting mixture was stirred at 80° C. for 6 hours and then adjusted to pH 7 by adding a 0.5 N methanol solution of sodium hydroxide.

The low-boiling solvent was then distilled off from the pH-adjusted solution under reduced pressure at 40–50° C. and the residue was filtered to give a 50% (by weight) solution (resin solution B). To 100 g of this resin solution B was then added 127 g of a 10% (by weight) aqueous solution of triphenylborane-sodium hydroxide adduct dropwise at 70° C. over 1 hour, 20 g of amylcinnamaldehyde was then added, and the mixture was maintained at that temperature for 2 hours. The solution thus obtained was deprived of the solvent under reduced pressure, 200 g of xylene was added and the solvent was further removed under reduced pressure and the remaining liquid was filtered to give a resin solution in xylene with a resin solid concentration of 50% by weight (resin solution C).

Example 3

The same apparatus as used in Example 1 was charged with 80 g of xylene and 20 g of n-butanol and the charge was heated and then maintained at 100° C. To this liquid was added a mixture of 20 g of 4-vinylpyridine, 50 g of methyl methacrylate, 25 g of aminostyrene, 5 g of n-butyl acrylate and 1.5 g of α, α'-azobisisobutyronitrile dropwise over 5 hours, 30 g of triphenylborane was further added in the pyridine complex form, and the mixture was maintained at 80° C. for 2 hours.

Then, 100 g of xylene and 22 g of benzaldehyde were added to the above reaction mixture, the byproduct pyridine was removed while distilling off the low-boiling solvent under reduced pressure, and the remaining liquid was then filtered to give a resin solution in xylene (resin solution D) with a resin solid concentration of 50% by weight.

Example 4

A resin solution in xylene with a resin solid concentration of 50% by weight (resin solution E) was obtained in the same manner as in Example 3 except that 15 g of tributylborane-pyridine complex was used in lieu of 30 g of triphenylborane in pyridine complex form.

Example 5

A resin solution in xylene with a resin solid concentration of 50% by weight (resin solution F) was obtained in the same manner as in Example 1 except that 220 g of a 10% aqueous solution of diphenylmonooctylboran-sodium hydroxide adduct was used in lieu of triphenylborane-sodium hydroxide adduct.

Example 6

A 50% (by weight) resin solution (resin solution B) was obtained in the same manner as in Example 2. To 100 g of this resin solution B was then added 200 g of a 10% (by weight) aqueous solution of triphenylborane-sodium hydroxide adduct dropwise at 70° C. over 1 hour, then 10 g of benzaldehyde was added, and the mixture was maintained at that temperature for 2 hours. Thereafter, the liquid obtained was deprived of the solvent under reduced pressure, 200 g of xylene was added, the solvent was partially removed and the remaining liquid was filtered to give a resin solution in xylene with a resin solid concentration of 50% by weight (resin solution G).

Comparative Example 1

The same apparatus as used in Example 1 was charged with 150 g of the same 40% (by weight) aqueous solution of polyallylamine as used in Example 1, and then, 50 g of methanol, 100 g of xylene and 110 g of benzaldehyde were added thereto. The mixture was maintained at 70° C. for 2 hours. Then, water and methanol were removed under reduced pressure, and 150 g of xylene was added to give a resin solution in xylene with a resin solid concentration of 50% by weight (resin solution H).

Comparative Example 2

The same apparatus as used in Example 1 was charged with 80 g of xylene and 20 g of n-butanol, and was maintained at 90° C. To this solution was added dropwise over 3 hours 20 g of 4-vinylpyridine, 50 g of methyl methacrylate, 25 g of styrene, 5 g of n-butyl acrylate and 1.5 g of α, α'-azobisisobutyronitrile dropwise, and the mixture was maintained for one hour. Then, 30 g of triphenylborane was further added in the pyridine complex form, and the mixture was maintained at 80° C. for 2 hours. After 100 g of xylene was added thereto, pyridine was removed in the same manner as that of Example 3 to give a resin solution in xylene with a resin solid concentration of 50% by weight (resin solution Examples 7 to 13 and Comparative Examples 3 to 6

Coatings were prepared according to the respective formulations given in Table 1 by using one of the resin solutions obtained in Examples 1 to 6 and Comparative Examples 1 and 2, or the resin solution B, which is the intermediate product obtained in Example 2, or chlorinated rubber and other ingredients specified in said table and effecting dispersion of the respective ingredients in a Disper dispersion apparatus. In Table 1, the values are shown on the parts by weight basis.

TABLE 1

|  | Example | | | | | | | Comp. Ex | | | |
| --- | --- | --- | --- | --- | --- | --- | --- | --- | --- | --- | --- |
|  | 7 | 8 | 9 | 10 | 11 | 12 | 13 | 3 | 4 | 5 | 6 |
| Resin solution A | 40 | — | — | — | — | — | — | — | — | — | — |
| Resin solution C | — | 40 | — | — | — | — | — | — | — | — | — |
| Resin solution D | — | — | 35 | 40 | — | — | — | — | — | — | — |
| Resin solution E | — | — | — | — | 40 | — | — | — | — | — | — |
| Resin solution F | — | — | — | — | — | 40 | — | — | — | — | — |
| Resin solution G | — | — | — | — | — | — | 45 | — | — | — | — |
| Resin solution B | — | — | — | — | — | — | — | 40 | — | — | — |
| Chlorinated rubber | — | — | — | — | — | — | — | — | 40 | — | — |
| Resin solution H | — | — | — | — | — | — | — | — | — | 40 | — |
| Resin solution I | — | — | — | — | — | — | — | — | — | — | 35 |
| Copper suboxide | — | 25 | — | 25 | 30 | 25 | — | 25 | 25 | — | — |
| Zinc oxide | 10 | 10 | 10 | 5 | 5 | 10 | 5 | 5 | 5 | 10 | 10 |
| Titanium oxide | 15 | — | 21 | — | — | 5 | 12 | 5 | 6 | 15 | 21 |
| Iron oxide red | — | 5 | — | 5 | 3 | 5 | — | 7 | 5 | — | — |
| Phthalocyanine blue | — | — | 5 | — | — | — | 7 | — | — | — | 5 |
| 4,5-dichloro-2-n-octyl-3(2H)-iisothiazolone | — | 5 | — | — | — | 5 | 3 | 5 | — | — | — |
| pyridine-triphenylborane | 5 | — | — | — | 3 | — | — | — | 5 | 5 | — |
| N-(fluoro-dichloromethyl-thio)phthalimide | — | — | 5 | — | — | — | — | — | — | — | 5 |
| Zinc pyrithione | 5 | — | — | 5 | — | — | 3 | — | — | 5 | — |
| Copper pyrithione | — | 5 | — | — | 4 | — | — | — | — | — | — |

TABLE 1-continued

|  | Example | | | | | | | Comp. Ex | | | |
| --- | --- | --- | --- | --- | --- | --- | --- | --- | --- | --- | --- |
|  | 7 | 8 | 9 | 10 | 11 | 12 | 13 | 3 | 4 | 5 | 6 |
| Colloidal silica | 3 | 3 | 3 | 3 | 4 | 3 | 3 | 2 | 3 | 3 | 3 |
| Chlorinated paraffin | 2 | 2 | — | — | — | — | 2 | — | — | 2 | — |
| Polyvinyl ethyl ether | — | — | 4 | 2 | — | — | 4 | 5 | 4 | — | 4 |
| Dioctyl phthalate | 3 | — | — | — | — | — | — | — | — | 3 | — |
| Rosin | — | — | — | — | — | — | — | — | — | — | — |
| n-butanol | 3 | 5 | 5 | 3 | 5 | 5 | 3 | 3 | 3 | 3 | 5 |
| Xylene | 14 | — | 12 | 12 | 6 | 2 | 13 | 3 | 4 | 14 | 12 |

Using the resin solutions A to I and polymethyl methacrylate (polyMMA) as coatings, an antifouling test was performed by the method mentioned below.

The coatings obtained in Examples 7 to 13 and Comparative Examples 3 to 6 were also subjected to antifouling testing by the method mentioned below.

Antifouling Test

Test plates were prepared by applying each resin solution or coating, to a dry film thickness of about 150 $\mu$m, to copper plates (9×28 cm) sandblasted and pretreated for rust prevention by coating with a tar-epoxy coating. The test plates obtained were immersed in the sea at Aioi Bay, Hyogo Prefecture, Japan and evaluated for antifouling performance at timed intervals in terms of percentage (%) of organism-occupied area. The results are shown in Table 2 and Table 3.

○:The area occupied by organisms is 0% to less than 10%.

Δ:The area occupied by organisms is 10% to less than 40%.

×:The area occupied by organisms is not less than 40%.

TABLE 2

|  | Resin solution | | | | | | | | | Poly MMA |
| --- | --- | --- | --- | --- | --- | --- | --- | --- | --- | --- |
|  | A | C | D | E | F | G | B | H | I |  |
| Antifouling test |  |  |  |  |  |  |  |  |  |  |
| 3 months | ○ | ○ | ○ | ○ | ○ | ○ | X | ○ | ○ | X |
| 12 months | ○ | ○ | ○ | ○ | ○ | ○ | X | Δ | X | X |
| 18 months | ○ | ○ | ○ | Δ | ○ | ○ | X | X | X | X |

TABLE 3

|  | Example | | | | | | | Comp. Ex. | | | |
| --- | --- | --- | --- | --- | --- | --- | --- | --- | --- | --- | --- |
|  | 7 | 8 | 9 | 10 | 11 | 12 | 13 | 3 | 4 | 5 | 6 |
| Antifouling test |  |  |  |  |  |  |  |  |  |  |  |
| 3 months | ○ | ○ | ○ | ○ | ○ | ○ | ○ | X | Δ | ○ | ○ |
| 12 months | ○ | ○ | ○ | ○ | ○ | ○ | ○ | X | X | ○ | X |
| 18 months | ○ | ○ | ○ | ○ | ○ | ○ | ○ | X | X | ○ | X |
| 24 months | ○ | ○ | ○ | ○ | ○ | ○ | ○ | X | X | X | X |
| 30 months | ○ | ○ | ○ | ○ | ○ | ○ | ○ | X | X | X | X |

As is clear from the results of the above examples, the coatings which have the resins each comprising a polymer obtained by polymerizing a polymerizable unsaturated monomer(s) and having, at side chain terminals, a trisubstituted borane-amine complex and an azomethine group can show very excellent antifouling effects over a long period of time.

On the contrary, in the case of the coating free of any trisubstituted borane-amine complex and any azomethine group (Comparative Example 3), no antifouling effects were obtained at all. In the case of the coating containing triphenylborane-pyridine complex (Comparative Example 4) as such, it was found that the antifouling effects cannot last for long. In the case of using either a resin comprising a polymer having an azomethine group and no trisubstituted borane-amine complex (Comparative Example 5) or a resin comprising a polymer having a trisubstituted borane-amine complex and no azomethine group (Comparative Example 6), it was found that the antifouling effects cannot last for long.

Production Example 1

A four-necked flask equipped with a stirrer, reflux condenser and dropping funnel was charged with 1,000 mL of deionized water, and the contents were maintained at 60° C. Thereto was added 75 g of pyrithione sodium and, after dissolution of the same, 155 g of zinc nitrate heptahydrate was added, and the mixture was maintained at 60° C. for 2 hours. To this solution was added 120 g of methanol dropwise over 1 hour, and the resulting precipitate was collected by filtration. To the filtrate was further added 600 mL of ethanol, and the mixture was filtered. The precipitates obtained were combined and washed with three 300-mL portions of deionized water to give 91 g of a pale yellow powder (A) with a zinc content of 18% by weight.

Production Example 2

A four-necked flask equipped with a stirrer, reflux condenser and dropping funnel was charged with 1,000 mL of deionized water, and the contents were maintained at 60° C. Thereto was added 75 g of pyrithione sodium and, after dissolution of the same, 85 g of cupric chloride dehydrate was added, and the mixture was maintained at 60° C. for 2 hours. To this solution was added 100 g of ethanol dropwise over 1 hour, and the resulting precipitate was collected by filtration. To the filtrate was further added 700 mL of ethanol, and the mixture was filtered. The precipitates obtained were combined and washed with three 300-mL portions of deionized water to give 89 g of a pale green powder (B) with a copper content of 18% by weight.

Production Example 3

A four-necked flask equipped with a stirrer, reflux condenser and dropping funnel was charged with 1,500 mL of deionized water, and the contents were maintained at 70° C. To this was added 37 g of pyrithione sodium and, after dissolution of the same, 30 g of nickel chloride was added, and the mixture was maintained at 70° C. for 2 hours. To this solution was added 120 g of methanol dropwise over 1 hour, and the resulting precipitate was collected by filtration. To the filtrate was further added 600 mL of ethanol, and the mixture was filtered. The precipitates obtained were combined and washed with three 300-mL portions of deionized water to give 58 g of a pale green powder (C) with a nickel content of 18% by weight.

Production Example 4

A four-necked flask equipped with a stirrer, reflux condenser and dropping funnel was charged with 800 g of xylene and 150 g of n-butanol and the mixture was maintained at 90° C. To this mixture was added a mixed solution composed of 85 g of methyl methacrylate, 145 g of acrylic acid, 125 g of n-butyl methacrylate, 540 g of ethyl acrylate, 105 g of cyclohexyl acrylate and 15 g of azobisisobutyronitrile dropwise over 4 hours, and the mixture was then maintained at the same temperature for 30 minutes. Thereafter, a solution of 3 g of t-butylperoxy-2-ethylhexanoate in 50 g of xylene was added dropwise over 1 hour and then the same temperature was maintained for 3 hours to give a resin solution J. The resin had a number average molecular weight of 13,000 and the solid concentration was 50% by weight.

Production Example 5

A four-necked flask equipped with a stirrer, reflux condenser and dropping funnel was charged with 450 g of xylene and 500 g of n-butanol and the mixture was maintained at 90° C. To this mixture was added a mixed solution composed of 80 g of methyl methacrylate, 70 g of acrylic acid, 25 g of 2-hydroxyethyl methacrylate, 640 g of ethyl acrylate, 75 g of cyclohexyl acrylate, 110 g of n-butyl acrylate and 25 g of t-butylperoxy-2-ethylhexanoate dropwise over 4 hours, and the mixture was then maintained at the same temperature for 30 minutes, to give a resin solution K. The resin had a number average molecular weight of 12,000 and the solid concentration was 50% by weight.

Production Example 6

A four-necked flask equipped with a stirrer, reflux condenser and decanter was charged with 200 g of the resin solution K, and 98 mL of a 0.2 N ethanolic solution of potassium hydroxide was added dropwise at room temperature over 1 hour. Then, the temperature was raised to 100° C., and 92 g of the solvent was removed, to give a resin solution L with a solid concentration of 52% by weight.

Production Example 7

A four-necked flask equipped with a stirrer, reflux condenser and decanter was charged with 200 g of the resin solution J, 60 g of the powder (A) and 200 g of xylene, and dehydration was effected under reflux and the reaction was allowed to proceed for 4 hours. Then, 150 g of the solvent was removed, and the remainder was filtered to give a pale yellow resin solution M with a solid concentration of 48% by weight. The metal content in this resin as determined by atomic absorption spectrometry was 6% by weight and, in IR spectrometry, a peak due to the metal salt was newly observed at 1,600 cm$^{-1}$.

Production Example 8

A four-necked flask equipped with a stirrer, reflux condenser and decanter was charged with 200 g of the resin solution J and 59 g of the powder (B), and dehydration was effected under reflux and the reaction was allowed to proceed for 4 hours, to give a pale yellow resin solution N with a solid concentration of 51% by weight.

Production Example 9

A four-necked flask equipped with a stirrer, reflux condenser and decanter was charged with 200 g of the resin solution L, 28 g of the powder (C) and 50 g of xylene, and the reaction was allowed to proceed at 90° C. for 4 hours. Then, 50 g of the solvent was removed, the same amount of n-butanol was added, and the mixture was filtered to give a pale yellow resin solution O with a solid concentration of 52% by weight.

Production Example 10

A four-necked flask equipped with a stirrer, reflux condenser and decanter was charged with 200 g of the resin solution K, 12 g of 2-mercaptopyridine N-oxide and 20 g of copper acetate monohydrate, and the reaction was allowed to proceed for 8 hours while distilling off the solvent under reflux and supplementing the same amount of xylene. After filtration, a green resin solution P was obtained with a solid concentration of 48% by weight. The copper content of this resin solid was 6.3% by weight and, upon IR spectroscopy, a peak was observed at 1,600 cm$^{-1}$.

Production Example 11

A four-necked flask equipped with a stirrer, reflux condenser and dropping funnel was charged with 110 g of a 50% ethanol solution of polyallylamine (degree of polymerization: 100), and the solution was maintained at 60° C. Thereto was added 30 g of the powder (A) and, after 2 hours of stirring, 90 g of benzaldehyde was added. While adding xylene dropwise under reflux, the byproduct water was removed with the solvent over 3 hours. Then, 20 g of n-butanol was added to give a resin solution Q with a solid concentration of 45% by weight.

Production Example 12

A four-necked flask equipped with a stirrer, reflux condenser and dropping funnel was charged with 200 g of a 50% methyl isobutyl ketone solution of a polymer composed of 45 mole percent of methyl methacrylate, 20 mole percent of 4-vinylpyridine and 35 mole percent of ethyl acrylate (degree of polymerization: 90) and the contents were maintained at 60° C. Thereto was added 55 g of the powder (B) and, after 2 hours of stirring, 50 g of xylene was added to give a resin solution R with a solid concentration of 53%.

Examples 14 to 19 and Comparative Examples 7 and 8

Using the resin solutions M, N, O, P, Q and R respectively obtained in Production Examples 7 to 12, the same antifouling test as mentioned above was performed. In the comparative examples, no coating was used (Comparative Example 7) or chlorinated rubber was applied (Comparative Example 8). The results are shown in Table 4.

TABLE 4

| Coating | Example | | | | | | Comp. Ex. | |
|---|---|---|---|---|---|---|---|---|
| | 14 | 15 | 16 | 17 | 18 | 19 | 7 | 8 |
| | Resin solution | | | | | | | Chlorinated |
| Material | M | N | O | P | Q | R | None | rubber |
| Antifouling test | | | | | | | | |
| 3 months | ○ | ○ | ○ | ○ | ○ | ○ | X | X |
| 12 months | ○ | ○ | ○ | ○ | ○ | ○ | X | X |
| 18 months | ○ | ○ | ○ | ○ | ○ | ○ | X | X |
| 24 months | ○ | ○ | ○ | ○ | ○ | Δ | X | X |

Examples 20 to 28 and Comparative Examples 9 to 11

Coatings were prepared according to the respective formulations given in Table 5 by using one of the resin solutions M, N, O, P, Q and R obtained in Examples 7 to 12 or chlorinated rubber and other ingredients specified in said table and effecting dispersion of the respective ingredients in a Disper dispersion apparatus. In Table 5, the values are shown on the parts by weight basis.

The coatings prepared were subjected to antifouling performance testing in the same manner as in Examples 14 to 19. The results are shown in Table 6.

TABLE 5

| | Example | | | | | | | | | Comp. Ex. | | |
|---|---|---|---|---|---|---|---|---|---|---|---|---|
| | 20 | 21 | 22 | 23 | 24 | 25 | 26 | 27 | 28 | 9 | 10 | 11 |
| Resin solution M | 45 | — | — | — | — | — | — | — | — | — | — | — |
| Resin solution N | — | 35 | — | — | — | — | — | — | — | — | — | — |
| Resin solution O | — | — | 45 | 40 | — | — | — | — | — | — | — | — |
| Resin solution P | — | — | — | — | 30 | 40 | — | — | — | — | — | — |
| Resin solution Q | — | — | — | — | — | — | 45 | 35 | — | — | — | — |
| Resin solution R | — | — | — | — | — | — | — | — | 35 | — | — | — |
| Chlorinated rubber | — | — | — | — | — | — | — | — | — | 20 | 20 | 20 |
| Copper suboxide | — | 20 | — | 25 | 30 | 25 | — | 30 | 40 | — | 20 | 25 |
| Zinc oxide | 10 | 10 | 10 | 5 | 5 | 5 | 5 | — | 5 | 10 | 10 | 5 |
| Titanium oxide | 15 | — | 15 | — | — | 5 | 15 | 5 | 5 | 15 | — | — |
| Iron oxide red | — | 5 | — | 5 | 3 | 5 | — | 5 | — | — | 5 | 5 |
| Phthalocyanine blue | 5 | — | 5 | — | — | — | 6 | — | — | 5 | — | — |
| 4-5-dichloro-2-n-octyl-3(2H)-iisothiazolone | — | — | — | — | — | 5 | 3 | — | — | — | — | — |
| pyridine-triphenylborane | — | — | — | — | 3 | — | — | 3 | — | — | — | 2 |
| N-(fluorodichloromethylthio)phthalimide | — | — | 5 | — | — | — | — | 5 | — | — | — | — |
| Zinc pyrithione | 5 | 2 | 5 | 5 | 5 | — | 3 | — | — | 5 | 2 | — |
| Copper pyrithione | — | 5 | — | — | — | — | — | — | 5 | — | 5 | — |
| Colloidal silica | 3 | 3 | 3 | 3 | 4 | 3 | 3 | 5 | 3 | 3 | 3 | 5 |
| Chlorinated paraffin | — | 4 | — | — | — | — | — | — | — | — | 4 | — |
| Polyvinyl ethyl ether | — | — | 4 | — | — | 4 | 3 | — | — | — | — | 5 |
| Dioctyl phthalate | 3 | — | — | — | — | — | — | — | — | 3 | — | — |
| Rosin | — | — | — | — | — | — | — | — | — | 5 | 5 | 10 |
| n-butanol | 3 | 5 | 5 | 3 | 5 | 5 | 3 | 2 | 3 | 3 | 5 | 3 |
| Xylene | 11 | 11 | 3 | 14 | 15 | 7 | 10 | 10 | 4 | 31 | 21 | 20 |

TABLE 6

|  | Example | | | | | | | | | Comp. Ex. | | |
| --- | --- | --- | --- | --- | --- | --- | --- | --- | --- | --- | --- | --- |
|  | 20 | 21 | 22 | 23 | 24 | 25 | 26 | 27 | 28 | 9 | 10 | 11 |
| Antifouling test | | | | | | | | | | | | |
| 3 months | ○ | ○ | ○ | ○ | ○ | ○ | ○ | ○ | ○ | ○ | ○ | ○ |
| 12 months | ○ | ○ | ○ | ○ | ○ | ○ | ○ | ○ | ○ | ○ | ○ | ○ |
| 18 months | ○ | ○ | ○ | ○ | ○ | ○ | ○ | ○ | ○ | X | Δ | Δ |
| 24 months | ○ | ○ | ○ | ○ | ○ | ○ | ○ | ○ | ○ | X | X | X |
| 30 months | ○ | ○ | ○ | ○ | ○ | ○ | ○ | ○ | Δ | X | X | X |

As is evident from the results of the above examples, the coatings which have the resins each comprising a polymer obtained by polymerizing a polymerizable monomer(s) and having, at a side chain terminal, a group represented by the following general formula (1) are used were found to be capable of showing very excellent antifouling effects over a long period of time.

INDUSTRIAL APPLICABILITY

Since the resin for use in an antifouling coating of the present invention has the constitution and characteristics mentioned above and, therefore, the antifouling coating in which said resin is used is low in mammalian toxicity, among others, and can produce very excellent antifouling effects over a long period of time since it is possible to control the rate of elution.

What is claimed is:

1. An antifouling coating comprising a resin for use in an antifouling coating, wherein the resin for use in an antifouling coating comprises a polymer obtained by polymerizing a polymerizable unsaturated monomer and having, at a side chain terminal thereof, a trisubstituted borane-amine complex or a group represented by the following general formula (1):

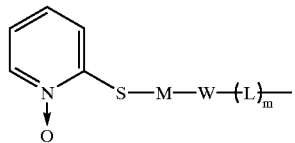
(1)

wherein M represents a metal selected from the group consisting of copper, zinc, nickel and cobalt, - - - means a chemically bound state, W represents —N($R^1$)$R^2$—, in which $R^1$ and $R^2$ may be the same or different and each represents a hydrogen atom or an alkyl group containing 1 to 4 carbon atoms, —OCO—, —$OSO_2$— or

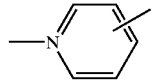
(2)

L represents an alkylene group containing 1 to 4 carbon atoms, and m represents an integer of 0 to 4.

2. An antifouling coating for fishing nets which comprises the antifouling coating according to claim 1.

3. An antifouling coating according to claim 1, wherein the trisubstituted borane is represented by the following general formula

(3)

wherein $R^3$, $R^4$ and $R^5$ are the same or different and each represents an aromatic or aliphatic hydrocarbon group containing 4 to 20 carbon atoms.

4. An antifouling coating according to claim 3, wherein at least two of $R^3$, $R^4$ and $R^5$ are phenyl groups.

5. The antifouling coating according to claim 3, wherein all of $R^3$, $R^4$ and $R^5$ are phenyl groups.

* * * * *